United States Patent [19]

Murphy

[11] Patent Number: 5,574,652
[45] Date of Patent: Nov. 12, 1996

[54] AUTOMATED CONTROL SYSTEM FOR MACHINE TOOL

[75] Inventor: Michael A. Murphy, Barrie, Canada

[73] Assignee: Dana Corporation, Toledo, Ohio

[21] Appl. No.: 18,767

[22] Filed: Feb. 17, 1993

[51] Int. Cl.⁶ ............................................. G06F 19/00
[52] U.S. Cl. .................. 364/474.22; 364/474.11; 364/474.19
[58] Field of Search .................. 364/474.01–474.37, 364/188–191

[56] References Cited

U.S. PATENT DOCUMENTS

| | | | |
|---|---|---|---|
| 4,118,776 | 10/1978 | Isomura. | |
| 4,370,705 | 1/1983 | Imazeki et al.. | |
| 4,443,865 | 4/1984 | Schultz et al.. | |
| 4,446,525 | 5/1984 | Hoch et al.. | |
| 4,641,236 | 2/1987 | Brooks | 364/474.23 |
| 4,648,028 | 3/1987 | DeKlotz et al. | 364/474.22 |
| 4,750,105 | 6/1988 | Ohkawa et al.. | |
| 4,757,459 | 7/1988 | Lauchnor et al.. | |
| 4,827,446 | 5/1989 | Kawamura et al.. | |
| 4,829,423 | 5/1989 | Tennant et al.. | |
| 4,887,221 | 12/1989 | Davis et al.. | |
| 5,061,887 | 10/1991 | Miyata et al. | 364/474.22 |
| 5,121,319 | 6/1992 | Fath et al. | 364/188 |
| 5,177,420 | 1/1993 | Wada et al. | 364/474.11 |
| 5,251,142 | 10/1993 | Cramer | 364/474.13 |
| 5,315,524 | 5/1994 | Seki et al. | 364/474.25 |

FOREIGN PATENT DOCUMENTS

| | | | |
|---|---|---|---|
| 59-166447 | 9/1984 | Japan | 364/474.22 |
| 2054909 | 2/1981 | United Kingdom | 364/474.27 |

*Primary Examiner*—Roy N. Envall, Jr.
*Assistant Examiner*—Steven R. Garland
*Attorney, Agent, or Firm*—MacMillan Sobanski & Todd

[57] ABSTRACT

A control system for controlling multiple operations of a machine tool includes an electronic controller. The controller is programmed to execute sequences of command instructions, each sequence representing a group of command instructions which defines a single operation or unit of work for the machine tool. A plurality of sequences are grouped together to define a machine cycle for the machine tool. An input mechanism is provided for permitting an operator of the machine tool to generate control signals to the controller to control the operation thereof. A video display is also provided for permitting an operator of the machine tool to monitor the operation thereof. The video display shows a plurality of the sequences in the machine cycle for performing certain functions when operated in the forward mode, as well as the corresponding sequences in the machine cycle for performing the opposite functions when operated in the reverse mode. In the run mode, the video display highlights only the current sequence being performed in the forward mode. In the command mode, the video display highlights the next sequence to be performed if the step forward button is depressed and next sequence to be performed if the step reverse button is depressed. The controller is also programmed to display error messages in easy to understand text language for the operator.

20 Claims, 14 Drawing Sheets

LEFT HEAD

| FWD | REV |
|---|---|
| START HYDRAULIC PUMP | STOP HYDRAULIC PUMP |
| ADVANCE LEFT HEAD | RETRACT LEFT HEAD |
| START LEFT DRILL | STOP LEFT DRILL |

RIGHT HEAD

| FWD | REV |
|---|---|
| START HYDRAULIC PUMP | STOP HYDRAULIC PUMP |
| ADVANCE RIGHT DRILL | RETRACT RIGHT HEAD |
| START RIGHT DRILL | STOP RIGHT DRILL |

FIG. 5

LEFT HEAD

| FWD | REV |
|---|---|
| START HYDRAULIC PUMP | STOP HYDRAULIC PUMP |
| ADVANCE LEFT HEAD | RETRACT LEFT HEAD |
| START LEFT DRILL | STOP LEFT DRILL |

RIGHT HEAD

| FWD | REV |
|---|---|
| START HYDRAULIC PUMP | STOP HYDRAULIC PUMP |
| ADVANCE RIGHT DRILL | RETRACT RIGHT HEAD |
| START RIGHT DRILL | STOP RIGHT DRILL |

FIG. 6

```
                        LEFT HEAD
         FWD                              REV

ADVANCE LEFT HEAD                RETRACT LEFT HEAD

START LEFT DRILL                 STOP LEFT DRILL

DRILL LEFT PART                  RETRACT LEFT HEAD

RIGHT HEAD
         FWD                              REV

START HYDRAULIC PUMP             STOP HYDRAULIC PUMP

ADVANCE RIGHT DRILL              RETRACT RIGHT HEAD

START RIGHT DRILL                STOP RIGHT DRILL
```
~ 50

FIG. 7

LEFT HEAD

| FWD | REV |
|---|---|
| START LEFT DRILL | STOP LEFT DRILL |
| DRILL LEFT PART | RETRACT LEFT HEAD |
| RETRACT LEFT HEAD | DRILL LEFT PART |

RIGHT HEAD

| FWD | REV |
|---|---|
| START HYDRAULIC PUMP | STOP HYDRAULIC PUMP |
| ADVANCE RIGHT DRILL | RETRACT RIGHT HEAD |
| START RIGHT DRILL | STOP RIGHT DRILL |

LEFT HEAD

| FWD | REV |
|---|---|
| DRILL LEFT PART | RETRACT LEFT HEAD |
| [RETRACT LEFT HEAD] | DRILL LEFT PART |
| STOP LEFT DRILL | START LEFT DRILL |

RIGHT HEAD

| FWD | REV |
|---|---|
| START HYDRAULIC PUMP | STOP HYDRAULIC PUMP |
| ADVANCE RIGHT DRILL | RETRACT RIGHT HEAD |
| START RIGHT DRILL | STOP RIGHT DRILL |

FIG. 9

LEFT HEAD

| FWD | REV |
|---|---|
| DRILL LEFT PART | RETRACT LEFT HEAD |
| RETRACT LEFT HEAD | DRILL LEFT PART |
| STOP LEFT DRILL | START LEFT DRILL |

RIGHT HEAD

| FWD | REV |
|---|---|
| START HYDRAULIC PUMP | STOP HYDRAULIC PUMP |
| ADVANCE RIGHT DRILL | RETRACT RIGHT HEAD |
| START RIGHT DRILL | STOP RIGHT DRILL |

FIG. 10

LEFT HEAD

| FWD | REV |
|---|---|
| START HYDRAULIC PUMP | STOP HYDRAULIC PUMP |
| ADVANCE LEFT HEAD | RETRACT LEFT HEAD |
| START LEFT DRILL | STOP LEFT DRILL |

RIGHT HEAD

| FWD | REV |
|---|---|
| START HYDRAULIC PUMP | STOP HYDRAULIC PUMP |
| ADVANCE RIGHT DRILL | RETRACT RIGHT HEAD |
| START RIGHT DRILL | STOP RIGHT DRILL |

FIG. 11

AUTOMATED CONTROL SYSTEM FOR MACHINE TOOL

BACKGROUND OF THE INVENTION

This invention relates in general to machine controllers and in particular to an improved automated control system for controlling multiple operations of a machine tool.

Many different machine tools are known in the art for performing various operations on a workpiece. Typically, a single machine tool includes a plurality of individual tools, each of which is capable of performing an operation on the workpiece. In many instances, these operations are related to one another in the sense that one operation must be completed before another operation can begin. Thus, the timing and sequence of the various individual operations must usually be regulated in some manner.

To accomplish this efficiently, it is known to provide a machine tool with an electronic controller. Such electronic controllers are typically embodied as programmable controllers, microprocessors, or similar automated computing devices which are connected to the various individual tools provided on the machine tool. The controllers are usually programmed with a series of instructions which define the particular individual tools to be used and the timing and sequence thereof. Many such electronic controllers are known in the art. However, it has been found that known electronic controllers of this type are typically quite complicated to program and operate. Furthermore, known electronic controllers of this type do not readily provide diagnostic information to the operator of the machine tool when abnormal occurrences arise. Thus, it would be desirable to provide an improved structure for an electronic controller for a machine tool which is simple to program and operate, and further which readily provides diagnostic information to the operator of the machine tool when abnormal occurrences arise.

SUMMARY OF THE INVENTION

This invention relates to an improved control system for controlling multiple operations of a machine tool. The control system includes an electronic controller having a plurality of outputs which provide signals to the various individual tools of the machine tool to control the operating conditions thereof. The controller further has a plurality of inputs providing it with signals which are representative of the operating conditions of the various individual tools of the machine tool. The controller is programmed to execute sequences of command instructions, each sequence representing a group of command instructions which defines a single operation or unit of work for the machine tool. A plurality of sequences are grouped together to define a machine cycle for the machine tool.

The control system includes an input mechanism for permitting an operator of the machine tool to control the operation thereof. The input mechanism can include a run mode button for operating the machine tool through a complete machine cycle and a command mode button for stepping the machine tool through individual sequences within the machine cycle. A step forward button and a step reverse button can be provided for selecting the individual sequences within the machine cycle to be performed when in the command mode.

The control system further includes a video display for permitting an operator of the machine tool to monitor the operation thereof. The video display shows a plurality of the sequences in the machine cycle for performing certain functions when operated in the forward mode, as well as the corresponding sequences in the machine cycle for performing the opposite functions when operated in the reverse mode. In the run mode, the video display highlights only the current sequence being performed in the forward mode. In the command mode, the video display highlights the next sequence to be performed if the step forward button is depressed and next sequence to be performed if the step reverse button is depressed. The controller is also programmed to display error messages in easy to understand text language for the operator.

Various objects and advantages of this invention will become apparent to those skilled in the art from the following detailed description of the preferred embodiment, when read in light of the accompanying drawings.

BRIEF DESCRIPTION OF THE DRAWINGS

FIGS. 5 through 10 are graphic representations of various screens displayed on the video terminal shown in FIG. 3 during operation of the machine tool in the run mode.

FIGS. 11 through 13 are graphic representations of various screens displayed on the video terminal shown in FIG. 3 during operation of the machine tool in the command mode.

DETAILED DESCRIPTION OF THE PREFERRED EMBODIMENT

1. Structure Of The Basic Machine

Figure 1:
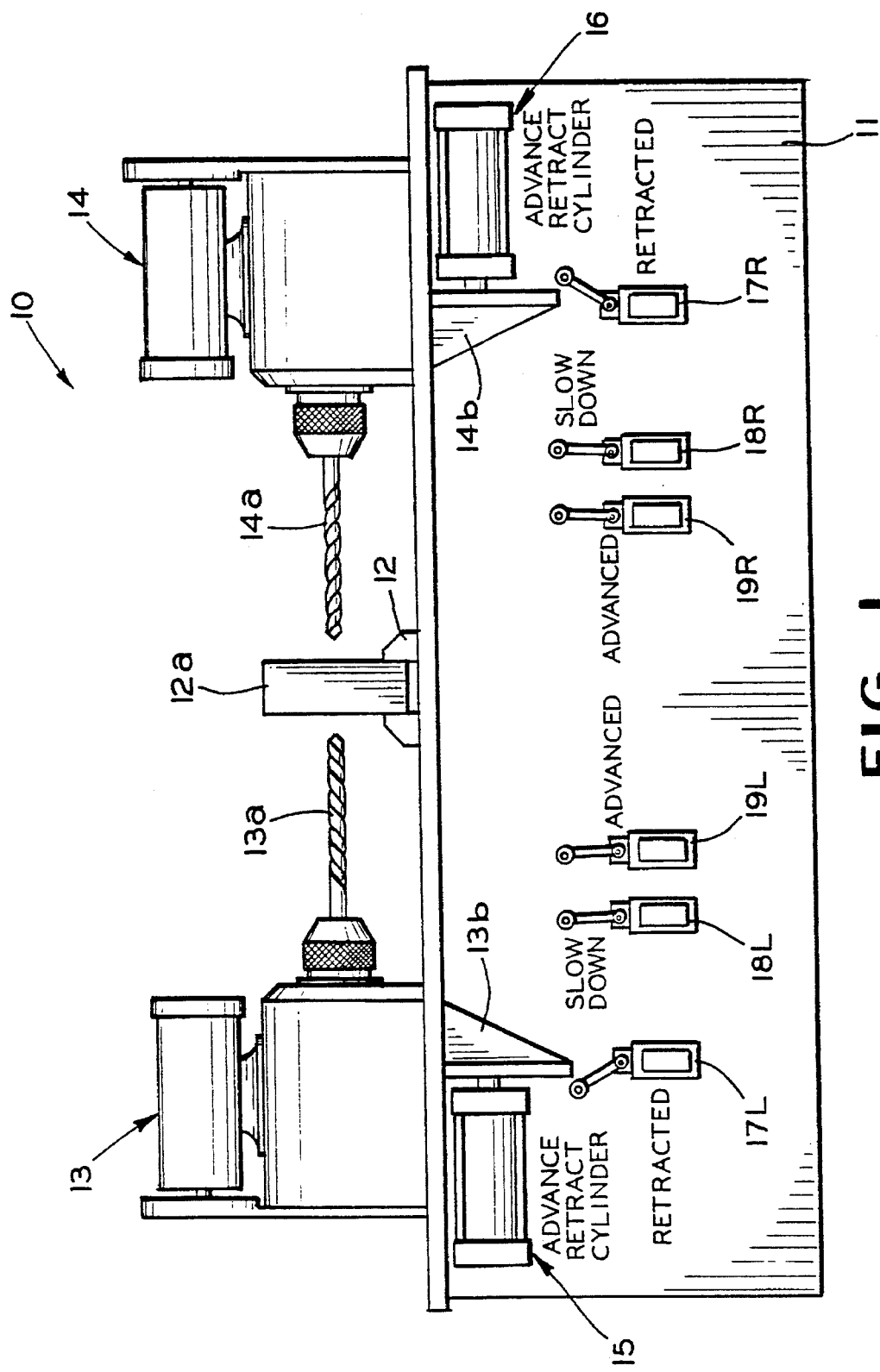
FIG. 1 is a side elevational view of a portion of a conventional machine tool adapted to be operated by an improved automated control system in accordance with this invention.

Referring now to the drawings, there is illustrated in FIG. 1 a portion of a machine tool, indicated generally at 10, adapted to be operated by an improved control system of this invention. The manner in which the control system operates the machine tool 10 will be described in detail below. The mechanical structure of the machine tool 10 is conventional in the art and forms no part of this invention. Thus, only those portions of the machine tool 10 which facilitate the explanation of the operation of the control system of this invention are shown and will be described below. It will be appreciated, furthermore, that this invention may be used to control the operations of virtually any other machine tool which is adapted to perform a plurality of sequentially related operations on a workpiece.

The illustrated machine tool 10 is a double ended drilling apparatus which includes a frame 11 having a releasable clamping mechanism 12 secured to an upper surface thereof. The clamping mechanism 12 can be embodied as any structure which is adapted to engage and firmly support a workpiece 12a relative to the frame 11. The clamping mechanism 12 is preferably located near the center of the upper surface of the frame 11. The illustrated machine tool 10 further includes left and right drill assemblies indicated generally at 13 and 14, respectively. The left and right drill assemblies are located on opposite sides of the clamping mechanism 12 and, thus, on opposite sides of the workpiece 12a. The drill assemblies 13 and 14 are conventional in the art, including respective electric motors which can be selectively energized to cause rotational movement of respective drill bits 13a and 14a. Such drill bits 13a and 14a are provided for drilling holes into the opposite sides of the workpiece 12a, as will be described below.

Each of the drill assemblies 13 and 14 is supported on the upper surface of the frame 11 by conventional means for permitting selective sliding movement toward and away from the workpiece 12a. Additionally, the drill assemblies 13 and 14 are provided with respective depending brackets 13b and 14b. The brackets 13b and 14b extend downwardly through respective slots or similar openings (not shown) formed through the upper surface of the frame 11. The brackets 13b and 14b are secured to their respective drill assemblies 13 and 14 for sliding movement therewith.

Means are provided for selectively causing sliding movement of each of the drill assemblies 13 and 14 toward and away from the workpiece 12a. In the illustrated embodiment, this means for causing sliding movement includes left and right hydraulic cylinder assemblies indicated generally at 15 and 16, respectively. The hydraulic cylinder assemblies 15 and 16 are conventional in art, each including an external cylinder housing 15a and 16a and an internal piston 15b and 16b (see FIG. 2). The external cylinder housings 15a and 16a are each secured to the frame 11 so as to be immovable relative thereto. The internal pistons 15b and 16b are connected to the depending brackets 13b and 14b by respective piston rod portions which extend outwardly of their respective cylinder housings 15a and 16a. Thus, the piston 15b of the left hydraulic cylinder assembly 15 is connected to the depending bracket 13b of the left drill assembly 13, while the piston 16b of the right hydraulic cylinder assembly 16 is connected to the depending bracket 14b of the right drill assembly 14. The manner in which the hydraulic cylinder assemblies 15 and 16 effect movement of the associated drill assemblies 13 and 14 will be described in detail below.

The machine tool 10 further includes a plurality of position sensing switches for sensing the sliding movements of each of the left and right drill assemblies 13 and 14. In the illustrated embodiment, a first group of three position sensing switches 17L, 18L, and 19L is provided for the left drill assembly 13, while a second group of three position sensing switches 17R, 18R, and 19R is provided for the right drill assembly 14. All of the position sensing switches can be embodied as conventional limit switches or proximity switches which are responsive to the movements of the brackets 13b and 14b for generating electrical signals in response thereto.

In the illustrated embodiment, the left outer position sensing switch 17L is provided to generate an electrical signal when its associated left drill assembly 13 is located in a retracted position. In the retracted position (illustrated in FIG. 1), the drill bit 13a of the left drill assembly 13 is spaced apart from the workpiece 12a so as to permit the installation and removal thereof from the clamping mechanism 12. This switch 17L will be referred to as LEFT.HEAD.RETRACTED.SW in the ensuing discussion of the operation of this invention.

The left intermediate position sensing switch 18L is provided to generate an electrical signal when its associated left drill assembly 13 has been moved from the retracted position to an intermediate position. In the intermediate position, the drill bit 13a of the left drill assembly 13 is located adjacent to, but still spaced apart from, the outer surface of the workpiece 12a. This switch 18L will be referred to as LEFT.HEAD.INTERMED.SW in the ensuing discussion of the operation of this invention.

The left inner position sensing switch 19L is provided to generate an electrical signal when its associated drill assembly 13 is positioned in an extended position. In the extended position, the drill bit 13a of the drill assembly 13 has drilled a desired distance within the workpiece 12a so that further drilling is unnecessary. This switch 19L will be referred to as LEFT.HEAD.ADVANCED.SW in the ensuing discussion of the operation of this invention.

The second group of position sensing switches 17R, 18R, and 19R function in the same manner with respect to the right drill assembly 14. These switches 17R, 18R, and 19R will be referred to as RIGHT.HEAD.RETRACTED.SW, RIGHT.HEAD.INTERMED.SW, and RIGHT.HEAD.ADVANCED.SW, respectively, in the ensuing discussion of the operation of this invention.

The two groups of position sensing switches permit the associated left and right drill assemblies 13 and 14 to be controlled in an efficient manner by the control system of this invention. For example, assume that it is desired to actuate the left hydraulic cylinder 15 to move the left drill assembly 13 to drill a hole in the left side of the workpiece 12a. When the signal generated by the left outer position sensing switch 17L is not generated, the left drill assembly 13 has been moved out of its retracted position. The left drill assembly 13 can be moved rapidly from the retracted position to the intermediate position to save time. However, when the left intermediate position sensing switch 18L generates an electrical signal, the left drill assembly 13 is located adjacent to the outer surface of the workpiece 12a.

At that point, the movement of the left drill assembly 13 can be slowed to accommodate the drilling operation about to occur. Then, when the left inner position sensing switch 19L generates an electrical signal, the drilling operation is completed. Once the drilling operation is completed, the left drill assembly 13 can be moved from the advanced position back to its original retracted position. Inasmuch as no drilling can occur during this movement, the left drill assembly 13 can be retracted rapidly all the way from the advanced position to the retracted position. The operation of the right drill assembly 14 can be controlled in the same manner.

2. Structure Of The Hydraulic Operating Circuit

Figure 2:
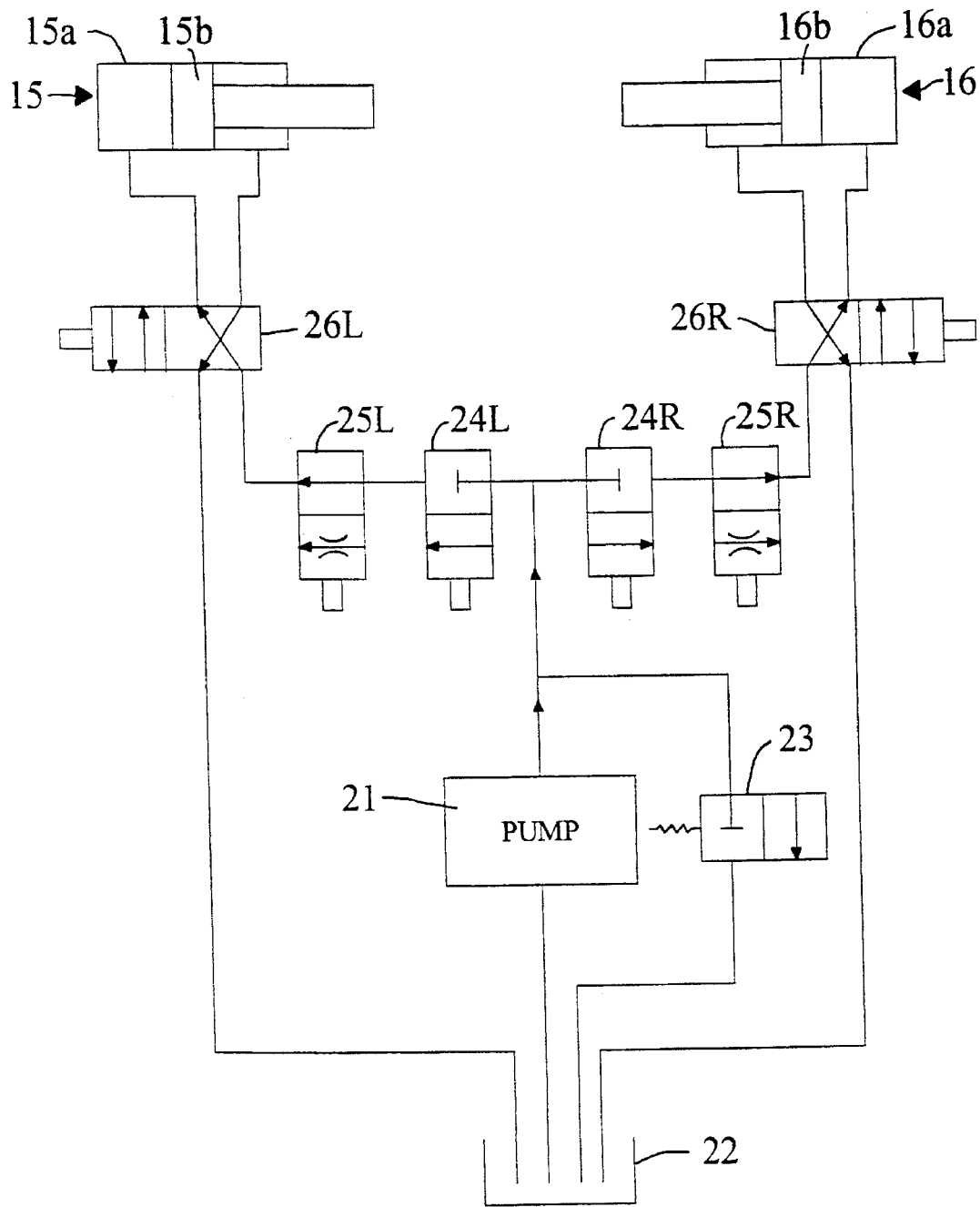
FIG. 2 is a schematic diagram of a conventional hydraulic operating circuit for the machine tool illustrated in FIG. 1.

Referring now to FIG. 2, there is illustrated a schematic diagram of a hydraulic operating circuit, indicated generally at 20, for the machine tool 10 shown in FIG. 1. As shown therein, the hydraulic operating circuit 20 includes a pump 21 (or any similar source of pressurized hydraulic fluid) for selectively providing the left and right hydraulic cylinder assemblies 15 and 16 with the respective flows of hydraulic fluid mentioned above. The pump 21 is conventional in the art and can include, for example, an electric motor which is connected to drive a hydraulic pump. The inlet of the pump 21 is connected to draw hydraulic fluid from a reservoir 22. The outlet of the pump 21 is connected through a conventional pressure relief valve 23 back to the reservoir 22.

The hydraulic operating circuit 20 further includes a plurality of solenoid actuated valves for controlling the operations of the left and right hydraulic cylinder assemblies 15 and 16 and, therefore, the movements of the left and right drill assemblies 13 and 14 connected thereto. In the illustrated embodiment, a first group of valves 24L, 25L, and 26L is provided for the left hydraulic cylinder assembly 15, while a second group of valves 24R, 25R, and 26R is provided for the right hydraulic cylinder assembly 16. The structures of these solenoid actuated valves are conventional in the art.

In the illustrated embodiment, the first valves 24L and 24R are each two position valves. In their illustrated first positions, the first valves 24L and 24R prevent the flow of hydraulic fluid therethrough. By actuation of their associated solenoids, however, the first valves 24L and 24R can be moved to their second positions, wherein the free flow of hydraulic fluid therethrough is permitted. The first valves 24L and 24R are maintained in their first positions when it is desired to prevent any movement of the associated drill assemblies 13 and 14. The first valves 24L and 24R are moved to their second positions when it is desired to move the associated drill assemblies 13 and 14 in any direction at any speed. These first solenoid actuated valves 24L and 24R will be referred to as LEFT.HEAD.MOVE.VALVE and RIGHT.HEAD.MOVE.VALVE, respectively, in the ensuing discussion of the operation of this invention.

In the illustrated embodiment, the second valves 25L and 25R are also each two position valves. In their illustrated first positions, the second valves 25L and 25R permit the free flow of hydraulic fluid therethrough. By actuation of their associated solenoids, however, the second valves 25L and 25R can be moved to their second positions, wherein the flow of hydraulic fluid therethrough is restricted, but not prevented. The second valves 25L and 25R are maintained in their first positions when it is desired to move the associated drill assemblies 13 and 14 rapidly from the retracted positions to the intermediate positions, or from the advanced positions to the retracted positions, as described above. The second valves 25L and 25R are moved to their second positions when it is desired to move the associated drill assemblies 13 and 14 slowly from the intermediate positions to the extended positions as also described above. These solenoid actuated valves 25L and 25R will be referred to as LEFT.HEAD.SLOW.VALVE and RIGHT.HEAD.SLOW.VALVE, respectively, in the ensuing discussion of the operation of this invention.

In the illustrated embodiment, the third valves 26L and 26R are also each two position valves. In their illustrated first positions, the third valves 26L and 26R are effective to cause movement of the pistons 15b and 16b respectively contained in the hydraulic cylinder assemblies 15 and 16 in a first direction so as to move the associated drill assemblies 13 and 14 from their retracted positions to their extended positions, as discussed above. By actuation of their associated solenoids, however, the third valve 26L and 26R are effective to cause movement of the pistons 15b and 16b respectively contained in the hydraulic cylinder assemblies 15 and 16 in a second direction so as to move the associated drill assemblies 13 and 14 from their extended positions to their retracted positions, as discussed above. These solenoid actuated valves 26L and 26R will be referred to as LEFT.HEAD.RETRACT.VALVE and RIGHT.HEAD.RETRACT.VALVE, respectively, in the ensuing discussion of the operation of this invention.

When it is desired to move the left drill assembly 13 from the retracted position toward the workpiece 12a to drill a hole therein, the first valve 24L is moved to its second position, while the second and third valves 25L and 26L are maintained in their illustrated first positions. As a result, pressurized hydraulic fluid flows freely into the hydraulic cylinder assembly 15, resulting in rapid movement of the piston therein. When the left intermediate position sensing switch 18L generates an electrical signal indicating that its associated left drill assembly 13 has been moved to the intermediate position, the second valve 25L is moved to its second position. As a result, the flow of hydraulic fluid therethrough is restricted, resulting in slower but nonetheless continued movement of the left drill assembly 13. When the left inner position sensing switch 19L generates an electrical signal indicating that its associated left drill assembly 13 has been moved to the extended position, the first valve 24L is returned to its first position. As a result, the flow of hydraulic fluid therethrough is prevented, resulting in a discontinuation of movement of the left drill assembly 13.

When it is desired to retract the left drill assembly, the first and third valves 24L and 26L are moved to their second positions, while the second valve 25L is maintained in its first position. As a result, the flow of hydraulic fluid within the hydraulic cylinder assembly 15 is reversed. Also, the flow of hydraulic fluid through such valves 24L, 25L, and 26L is not restricted, resulting in rapid movement of the left drill assembly 13 in the opposite direction. When the left outer position sensing switch 17L generates an electrical signal indicating that its associated left drill assembly 13 has been moved to the retracted position, the first valve 24L is returned to its first position. As a result, the flow of hydraulic fluid therethrough is prevented, resulting in a discontinuation of movement of the left drill assembly 13 in the opposite direction. As discussed above, such rapid movement can be made because no drilling can occur during this retracting movement.

The operation of the right hydraulic cylinder assembly 16 can be controlled in the same manner. It will be appreciated that the movements of the two hydraulic cylinder assemblies 15 and 16 (and the drill assemblies 13 and 14 connected thereto) are controlled independently of one another, although they may be operated simultaneously if desired.

3. Structure Of The Control System

Figure 3:
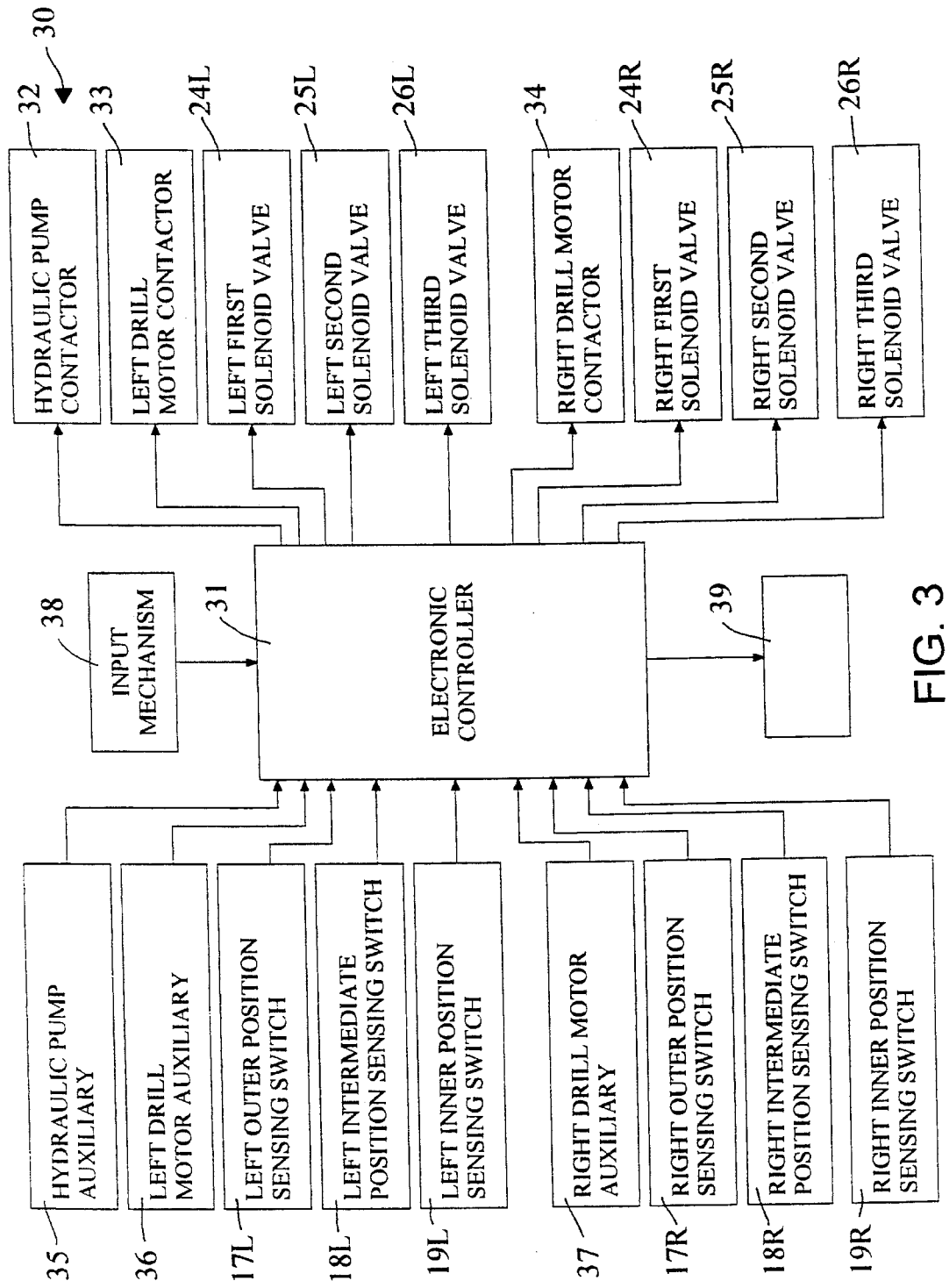
FIG. 3 is a block diagram of an electronic control system adapted to operate the machine tool illustrated in FIGS. 1 and 2.

Referring now to FIG. 3, there is illustrated a block diagram of a control system, indicated generally at 30, in accordance with this invention. The control system 30 is adapted to operate the machine tool 10 illustrated in FIGS. 1 and 2. The control system 30 includes a conventional electronic controller 31 which may be embodied as a microprocessor, computer, or other similar electronic computing apparatus. As shown in FIG. 3, the controller 31 has a plurality of inputs and outputs. In a manner which will be described in detail below, the controller 31 is responsive to an internal operating program and to electronic signals supplied to the inputs thereof for controlling the operation of the machine tool 10. Such operational control is exerted by the controller 31 by means of electronic signals which are generated through the outputs thereof to the machine tool 10.

Before beginning a detailed discussion of the structure of the control system 30, several terms should be clearly defined as used herein. The term "contactor" refers to an electrical switch which is provided on an associated device for controlling the operation thereof. When a contactor is closed, electrical energy is supplied to the associated device to cause operation thereof. When a contactor is opened, electrical energy is not supplied to the associated device to prevent operation thereof. The contactor is responsive to electrical signals generated by the controller 31 for selectively closing and opening. The term "auxiliary" refers to an electrical contact which is provided on the contactor of the associated device for indicating the operating condition thereof. When a contactor is closed, the associated auxiliary is also closed to generate a closed condition signal. When a contactor is opened, the associated auxiliary is also opened to generate an opened condition signal. The signals generated by the auxiliaries are fed to the controller 31.

The outputs from the electronic controller 31 will now be described. As shown in FIG. 3, a first output from the controller 31 is a hydraulic pump contactor 32. When the hydraulic pump contactor 32 is closed, electrical energy is supplied to the pump 21. As a result, the pressurized hydraulic fluid is supplied to the hydraulic operating circuit 20 as described above. When the hydraulic pump contactor 32 is opened, electrical energy is not supplied to the pump 21. As a result, no pressurized hydraulic fluid is supplied to the hydraulic operating circuit 20 as described above. This contactor 32 will be referred to as HYD.PUMP.CONT. in the ensuing discussion of the operation of this invention. In a manner which will be described in detail below, the controller 31 generates electrical signals to the hydraulic pump contactor 32 to control the operation thereof.

A second group of outputs from the controller 31 includes a left drill motor contactor 33 and a right drill motor contactor 34. These contactors 33 and 34 are provided to control the operations of the electric motors of the associated left and right drill assemblies 13 and 14. Thus, when the drill motor contactors 33 and 34 are closed, the drill bits 13a and 14a of the associated left and right drill assemblies 13 and 14 are rotated to drill holes in the workpiece 12a. When the drill motor contactors 33 and 34 are opened, the drill bits 13a and 14a of the associated left and right drill assemblies 13 and 14 are not rotated. These contactors 33 and 34 will be referred to as LEFT.MOTOR.CONT. and RIGHT.MOTOR.CONT., respectively, in the ensuing discussion of the operation of this invention. In a manner which will be described in detail below, the controller 31 generates electrical signals to the left and right drill motor contactors 33 and 34 to control the operations thereof.

A third group of outputs from the controller 31 includes the left group of solenoid actuated valves 24L, 25L, and 26L and the right group of solenoid actuated valves 24R, 25R, and 26R. As discussed above, these valves are provided for controlling the operations of the left and right hydraulic cylinder assemblies 15 and 16 and, therefore, the movements of the left and right drill assemblies 13 and 14 connected thereto. In a manner which will be described in detail below, the controller 31 generates electrical signals to both the left group of solenoid actuated valves 24L, 25L, and 26L and the right group of solenoid actuated valves 24R, 25R, and 26R to control the operations thereof.

The inputs to the electronic controller 31 will now be described. As shown in FIG. 3, a first input to the controller 31 is a hydraulic pump auxiliary 35. This auxiliary 35 is provided to generate signals which are indicative of the operating condition of the associated hydraulic pump contactor 32. When the hydraulic pump contactor 32 is closed, the hydraulic pump auxiliary 35 is also closed to generate a closed condition signal. When the hydraulic pump contactor 32 is opened, the hydraulic pump auxiliary 35 is also opened to generate an opened condition signal. This auxiliary 35 will be referred to as HYD.PUMP.AUX. in the ensuing discussion of the operation of this invention. In a manner which will be described in detail below, the controller 31 utilizes the electrical signals from the hydraulic pump auxiliary 35 to control the operation of the machine tool 10.

A second group of inputs to the controller 31 includes a left drill motor auxiliary 36 and a right drill motor auxiliary 37. These auxiliaries 36 and 37 are provided to generate signals which are indicative of the operating conditions of the associated left and right drill contactors 33 and 34. When either of the drill motor contactors 33 and 34 are closed, the associated auxiliaries 36 and 37 are also closed to generate respective closed condition signals. When either of the drill motor contactors 33 and 34 are opened, the associated auxiliaries 36 and 37 are also opened to generate respective opened condition signals. These auxiliaries 36 and 37 will be referred to as LEFT.MOTOR.AUX. and RIGHT.MOTOR.AUX., respectively, in the ensuing discussion of the operation of this invention. In a manner which will be described in detail below, the controller 31 utilizes the electrical signals from the left and right drill motor auxiliaries 36 and 37 to control the operation of the machine tool 10.

A third group of inputs to the controller 31 includes the left group of position sensing switches 17L, 18L, and 19L and the right group of position sensing switches 17R, 18R, and 19R. As discussed above, these switches are provided for sensing the sliding movements of each of the left and right drill assemblies 13 and 14. In a manner which will be described in detail below, the controller 31 utilizes the electrical signals from both the left group of position sensing switches 17L, 18L, and 19L and the right group of position sensing switches 17R, 18R, and 19R to control the operation of the machine tool 10.

Lastly, as shown in FIG. 3, an input mechanism 38 and a video display 39 are connected to the controller 31. The input mechanism 38 is conventional in the art and may be embodied as any means for permitting an operator to generate controls signals to the controller 31, such as a keyboard, a pendant, and the like. The video display 39 is also conventional in the art and may be embodied as any means for displaying the operating condition of the controller 31 and the machine tool 10. The structure and operation of both the input mechanism 38 and the video display 39 will be described in detail below.

4. Command Language

The controller 31 of the control system 30 is programmed by means of a command language to operate the machine tool 10 in a desired manner. The command language is composed of a series of simple command instructions. As will be explained in detail below, the command instructions are arranged into groups referred to as sequences. Each sequence represents a group of command instructions which defines a single operation or unit of work of the machine tool 10. One or more sequences can be grouped together to define a full cycle of operation for the machine tool 10.

The following terms define the command instructions for the controller 31. A brief description of the intended function of each command instruction is set forth with its associated term.

SEQ.START—identifies the name of a particular series of command instructions which defines a single operation or unit of work. The SEQ.START command instruction is typically accompanied by a descriptive name related to the operation to be performed and by a legend to be displayed on the video display 39.

WATCHDOG—defines a time interval for completion of a sequence associated therewith. The WATCHDOG command instruction is typically accompanied by a number which represents the time period (preferably in seconds) for completion of the sequence. If the sequence is not completed within the defined time period, the controller 31 will shut down the machine tool 10 and display an error legend. The error legend can be, for example, a standard comment such as "Did Not Make In Time", as will be discussed below.

INPUT—defines a specific one of the plurality of inputs to the controller 31 discussed above. The INPUT command instruction is typically accompanied by the name of the particular input device and an operating condition therefor. The controller 31 will not proceed to the next command instruction in the sequence until the specified operating condition of the particular input device is satisfied.

OUTPUT—defines a specific one of the plurality of outputs from the controller 31 discussed above. The OUTPUT command instruction is typically accompanied by the name of the particular output device and an operating condition therefor. When the controller 31 reaches this command instruction, a control signal is sent to the particular output device to control the operating condition thereof.

DELAY—defines a time interval for delay before proceeding to the next command instruction in the sequence. The DELAY command instruction is typically accompanied by a number which represents the time period (preferably in seconds) for the delay.

TEST—defines a specific one of the plurality of inputs to the controller 31 discussed above. The TEST command instruction is typically accompanied by the name of the particular input device and an operating condition therefor. The TEST command instruction is similar to the INPUT command instruction, except that the controller 31 will not wait until the specified operating condition of the particular input device is satisfied before proceeding to the next command instruction in the sequence. Rather, the TEST command instruction is always followed by a GOTO command instruction. If the particular input device is in the specified operating condition, the controller 31 will move to the GOTO command instruction. If the particular input device is not in the specified operating condition, the controller 31 will skip the GOTO command instruction and move to the next command instruction in the sequence.

GOTO—directs the controller 31 to jump from the current command instruction to a specified command instruction within the same sequence. The GOTO command instruction is typically accompanied by a label identifying the specified next command instruction.

CALL—directs the controller 31 to jump from the current command instruction within a given sequence to the beginning of a different sequence. The CALL command instruction is typically accompanied by the name of the different sequence being called. After the controller 31 has performed the called sequence in its entirety, it returns to the next step in the original sequence.

ERROR—directs the controller 31 to shut down the machine tool 10. The ERROR command instruction is typically accompanied by a text message related to the nature of the detected error to be displayed on the video display.

COMPARE—directs the controller 31 to compare the value of the current number stored in an internal counter with a predetermined amount. The structure and operation of the internal counter will be described below. The COMPARE command instruction is typically accompanied by the name of the specific counter (the controller 31 may be programmed with more than one counter), an operator, and the predetermined amount. The operator may be EQUAL, GREATER-.THAN, GREATER.EQUAL (greater than or equal to), LESS.THAN, or LESS.EQUAL (less than or equal to). The COMPARE command instruction is always followed by a GOTO command instruction. If the specified counter meets the condition of the operator, the controller 31 will move to the GOTO command instruction. If the specified counter does not meet the condition of the operator, the controller 31 will skip the GOTO command instruction and move to the next command instruction in the sequence.

MODIFY—directs the controller 31 to modify the value of the current number stored in the internal counter. The MODIFY command instruction is typically accompanied by the name of the specific counter, an operator, and an amount. The operator may be ADD, SUBTRACT, MULTIPLY, DIVIDE, or PRESET. The operator typically includes a specific number by which to modify the specified counter. Alternatively, the operator may include the name of another counter, in which case the controller 31 uses the number stored the other counter to modify the specified counter.

SEQ.END—identifies the conclusion of a particular sequence. The SEQ.END command instruction is typically accompanied by the descriptive name of the associated sequence.

It will be appreciated that other command instructions may be created and used in a similar manner to perform other functions.

5. Sequence Format

Having defined all of the above discussed command instructions, the format of an individual sequence will now be discussed. As previously mentioned, a sequence represents a group of command instructions which defines a single operation or unit of work of the machine tool 10. For example, the first operation for the machine tool 10 would be to begin the operation of the pump 21. A sample format for a sequence for performing this operation would be as follows:

|     | SEQ.START | START.PUMP | "Start Hydraulic Pump" |
|     | WATCHDOG | 3 | |
|     | TEST | HYD.PUMP.AUX,ON | |
|     | GOTO | ...1 | |
|     | OUTPUT | HYD.PUMP.CONT,ON | |
|     | INPUT | HYD.PUMP.AUX,ON | |
|     | DELAY | 1.5 | |
| ...1 | SEQ.END | START.PUMP | |

The first command instruction identifies the name of this sequence as START.PUMP and provides the legend "Start Hydraulic Pump" which is displayed on the video display 39. The second command instruction provides a three second limit for completion of the entire sequence. The third command instruction causes the controller 31 to determine if the hydraulic pump 21 is already turned on. If so, the controller 31 jumps (by means of the GOTO fourth command instruction) to the final command instruction of the sequence, inasmuch as the ultimate function of this sequence (namely, turning on the hydraulic pump 21) has already been performed.

If the hydraulic pump 21 has not been turned on, the controller 31 executes the fifth command instruction, which is to generate an output signal to turn on the hydraulic pump contactor 32. As a result, the hydraulic pump 21 is turned on to supply pressurized hydraulic fluid to the hydraulic operating circuit 20. The sixth command instruction causes the controller 31 to wait for an input signal to be received from the hydraulic pump auxiliary 35, indicating that the hydraulic pump contactor 32 has, in fact, closed in response to the output signal from the controller 31. As mentioned above, the controller 31 will not proceed to the next command instruction until this condition is satisfied. When that occurs, the seventh command instruction causes the controller 31 to delay further operation for a period of one and one half seconds. This delay is provided to allow the hydraulic pump 21 to fully pressurize the hydraulic operating circuit 20 before regular operation. The eighth and final command instruction of the sequence is merely an indication of the end thereof.

A similar sequence can be constructed for the reverse operation, namely, to stop the operation of the pump. A sample format for a sequence for performing this operation would be as follows:

|   |   |   |   |
|---|---|---|---|
| | SEQ.START | STOP.PUMP | "Stop Hydraulic Pump" |
| | WATCHDOG | 1 | |
| | TEST | HYD.PUMP.AUX,OFF | |
| | GOTO | ... 1 | |
| | OUTPUT | HYD.PUMP.CONT,OFF | |
| | INPUT | HYD.PUMP.AUX,OFF | |
| ... 1 | SEQ.END | STOP.PUMP | |

It will be appreciated that the STOP.PUMP sequence is quite similar to the START.PUMP sequence, except that the DELAY command instruction has been omitted for obvious reasons. If desired, the TEST and GOTO command instructions could also be omitted.

A second operation for the machine tool 10 would be to advance one of the drill assemblies (the left drill assembly 13, for example) rapidly toward the workpiece 12a, prior to beginning the drilling operation. A sample format for a sequence for performing this operation would be as follows:

|   |   |   |   |
|---|---|---|---|
| | SEQ.START | ADVANCE.LEFT.HEAD | "Advance Left Head" |
| | WATCHDOG | 10 | |
| | TEST | LEFT.HEAD.INTERMED.SWITCH,ON | |
| | GOTO | ... 1 | |
| | TEST | LEFT.HEAD.ADVANCED.SWITCH,ON | |
| | GOTO | ... 1 | |
| | CALL | START.PUMP | |
| | OUTPUT | LEFT.HEAD.RETRACT.VALVE,OFF | |
| | OUTPUT | LEFT.HEAD.SLOW.VALVE,OFF | |
| | OUTPUT | LEFT.HEAD.MOVE.VALVE,ON | |
| | INPUT | LEFT.HEAD.INTERMED.SWITCH,ON | |
| | OUTPUT | LEFT.HEAD.MOVE.VALVE,OFF | |
| ... 1 | SEQ.END | ADVANCE.LEFT.HEAD | |

This sequence begins by testing to determine if the left drill assembly 13 is already advanced toward the workpiece. This is done by determining the status of the left intermediate position switch 18L and the left inner position switch 19L. If the left drill assembly 13 is already advanced toward the workpiece, the controller 31 jumps to the end of the sequence. If not, the START.PUMP sequence is called to activate the hydraulic pump 21, as described above.

Then, the sequence causes the controller 31 to actuate the solenoid valves 24L, 25L, and 26L to cause movement of the left drill assembly 13. The condition of the left intermediate position switch 18L is monitored to determine when the left drill assembly 13 has advanced to that point. When it has, the controller 31 causes further movement of the left drill assembly 13 to cease.

A similar sequence can be constructed for the reverse operation, namely, to retract the left drill assembly 13 rapidly after completion of the drilling operation. A sample format for a sequence for performing this operation would be as follows:

As before, it will be appreciated that the RETRACT.LEFT.HEAD sequence is quite similar to the ADVANCE.LEFT.HEAD sequence. Similar sequences can easily be ascertained for advancing and retracting the right drill assembly 14.

A third operation for the machine tool 10 would be to start the motor on one of the drill assemblies (the left drill assembly 13, for example). A sample format for a sequence for performing this operation would be as follows:

|   |   |   |   |
|---|---|---|---|
| | SEQ.START | RETRACT.LEFT.HEAD | "Retract Left Head" |
| | WATCHDOG | 10 | |
| | TEST | LEFT.HEAD.RETRACTED.SWITCH,ON | |
| | GOTO | ... 1 | |
| | CALL | START-PUMP | |
| | OUTPUT | LEFT.HEAD.RETRACT.VALVE,ON | |
| | OUTPUT | LEFT.HEAD.SLOW.VALVE,OFF | |
| | OUTPUT | LEFT.HEAD.MOVE.VALVE,ON | |
| | INPUT | LEFT.HEAD.RETRACTED.SWITCH,ON | |
| | OUTPUT | LEFT.HEAD.MOVE.VALVE,OFF | |
| ... 1 | SEQ.END | ADVANCE.LEFT.HEAD | |

```
      SEQ.START    START.LEFT.DRILL         "Start Left Drill"
      WATCHDOG     1
      TEST         LEFT.MOTOR.AUX,ON
      GOTO         ...1
      OUTPUT       LEFT.MOTOR.CONT,ON
      INPUT        LEFT.MOTOR.AUX,ON
      DELAY        0.1
...1  SEQ.END      START.LEFT.DRILL
```

Similarly, a sample format for a sequence for performing the opposite of this operation would be as follows:

```
SEQ.START    STOP.LEFT.DRILL          "Stop Left Drill"
WATCHDOG     1
OUTPUT       LEFT.MOTOR.CONT,OFF
INPUT        LEFT.MOTOR.AUX,OFF
SEQ.END      STOP.LEFT.DRILL
```

Also, similar sequences can easily be ascertained for starting and stopping the right drill.

A fourth operation for the machine tool 10 would be to advance one of the drill assemblies (the left drill assembly 13, for example) slowly toward the workpiece 12a to actually perform the drilling operation on the left side thereof. A sample format for a sequence for performing this operation would be as follows:

```
      SEQ.START    DRILL.LEFT.PART          "Drill Left Part"
      WATCHDOG     15
      TEST         LEFT.HEAD.ADVANCED.SWITCH,ON
      GOTO         ...1
      TEST         LEFT.HEAD.INTERMED.SWITCH,ON
      GOTO         ...2
      CALL         ADVANCE.LEFT.HEAD
...2  CALL         START.LEFT.DRILL
      CALL         START.PUMP
      OUTPUT       LEFT.HEAD.RETRACT.VALVE,OFF
      OUTPUT       LEFT.HEAD.SLOW.VALVE,ON
      OUTPUT       LEFT.HEAD.MOVE.VALVE,ON
      INPUT        LEFT.HEAD.ADVANCED.SWITCH,ON
      OUTPUT       LEFT.HEAD.MOVE.VALVE,OFF
...1  SEQ.END      DRILL.LEFT.PART
```

Also, a similar sequence can easily be ascertained for advancing the right drill assembly 14 slowly toward the workpiece 12a to actually perform the drilling operation on the right side thereof.

6. Machine Cycle Format

Having defined a number of sequences for performing individual operations, an entire machine cycle for the machine tool 10 can be defined. A sample format for such a machine cycle would be as follows:

```
SEQUENCE    START.PUMP
SEQUENCE    ADVANCE.LEFT.HEAD
SEQUENCE    START.LEFT.DRILL
```

-continued

```
SEQUENCE    DRILL.LEFT.PART
SEQUENCE    RETRACT.LEFT.HEAD
SEQUENCE    STOP.LEFT.DRILL
```

Under normal circumstances, the controller 31 would begin with the first sequence and step forward sequentially through the remaining sequences to drill a hole in the workpiece 12a. This would represent the normal forward mode of operation of the controller 31.

This group of sequences, which defines an entire machine cycle, will be referred to as AUTO.SEQUENCE "LEFT.HEAD". A similar machine cycle for the right drill assembly 14 can be easily determined and will be referred to as AUTO.SEQUENCE "RIGHT.HEAD". Each of these machine cycles, therefore, represents the entire amount of information required by the controller 31 to cause the machine tool 10 to execute the intended function, namely, to drill holes in the left and right sides of the workpiece 12a.

Under certain circumstances, which will be described below, it is desirable to have the controller 31 operate the machine in a reverse mode of operation. This reverse mode of operation can be created easily using the reverse operations described above for each of the sequences. Given the above machine cycle for the left drill assembly 13, therefore, a sample format for such a reverse series of sequences would be as follows:

| Forward Mode | | Reverse Mode | |
|---|---|---|---|
| SEQUENCE | START.PUMP | SEQUENCE | STOP.PUMP |
| SEQUENCE | ADVANCE.LEFT.HEAD | SEQUENCE | RETRACT.LEFT.HEAD |
| SEQUENCE | START.LEFT.DRILL | SEQUENCE | STOP.LEFT.DRILL |
| SEQUENCE | DRILL.LEFT.PART | SEQUENCE | RETRACT.LEFT.HEAD |
| SEQUENCE | RETRACT.LEFT.HEAD | SEQUENCE | DRILL.LEFT.PART |
| SEQUENCE | STOP.LEFT.DRILL | SEQUENCE | START.LEFT.DRILL |

The purpose for defining the machine cycle in both the forward mode and the reverse mode will be described below.

As mentioned above, the controller 31 may be programmed to keep track of the number of occurrences of a certain event and to control the operation of the machine tool 10 in accordance therewith. For example, it may be desirable to count the number of parts which are machined according to the AUTO.SEQUENCE "LEFT.HEAD" machine cycle. Inasmuch as the STOP.LEFT.DRILL sequence is the last sequence in that machine cycle, the STOP.LEFT.DRILL sequence discussed above may be modified as follows:

|       | SEQ.START | STOP.LEFT.DRILL | "Stop Left Drill" |
|-------|-----------|-----------------|-------------------|
|       | WATCHDOG  | 1               |                   |
|       | OUTPUT    | LEFT.MOTOR.CONT,OFF |               |
|       | INPUT     | LEFT.MOTOR.AUX,OFF |                |
|       | MODIFY    | PARTS.COUNTER,ADD,1 |               |
|       | COMPARE   | PARTS.COUNTER,EQUAL,100 |           |
|       | GOTO      | ...1            |                   |
|       | SEQ.END   | STOP.LEFT.DRILL |                   |
| ...1  | INJECT.LUBE |               |                   |
|       | MODIFY    | PARTS.COUNTER,PRESET,0 |            |
|       | SEQ.END   | STOP.LEFT.DRILL |                   |

In this modified STOP.LEFT.DRILL sequence, an internal counter entitled PARTS contained within the controller 31 is incremented by one each time the sequence is executed. When the count contained in the PARTS counter is equal to one hundred, the controller 31 executes an INJECT.LUBE command instruction, which causes a lubrication injector (not shown) on the machine tool 10 to inject a predetermined amount of lubricant at one or more locations therein. Then, the PARTS counter is reset to zero for further operation. Thus, the machine tool 10 is periodically lubricated based upon the usage thereof.

7. Controller Operation

Figure 4:
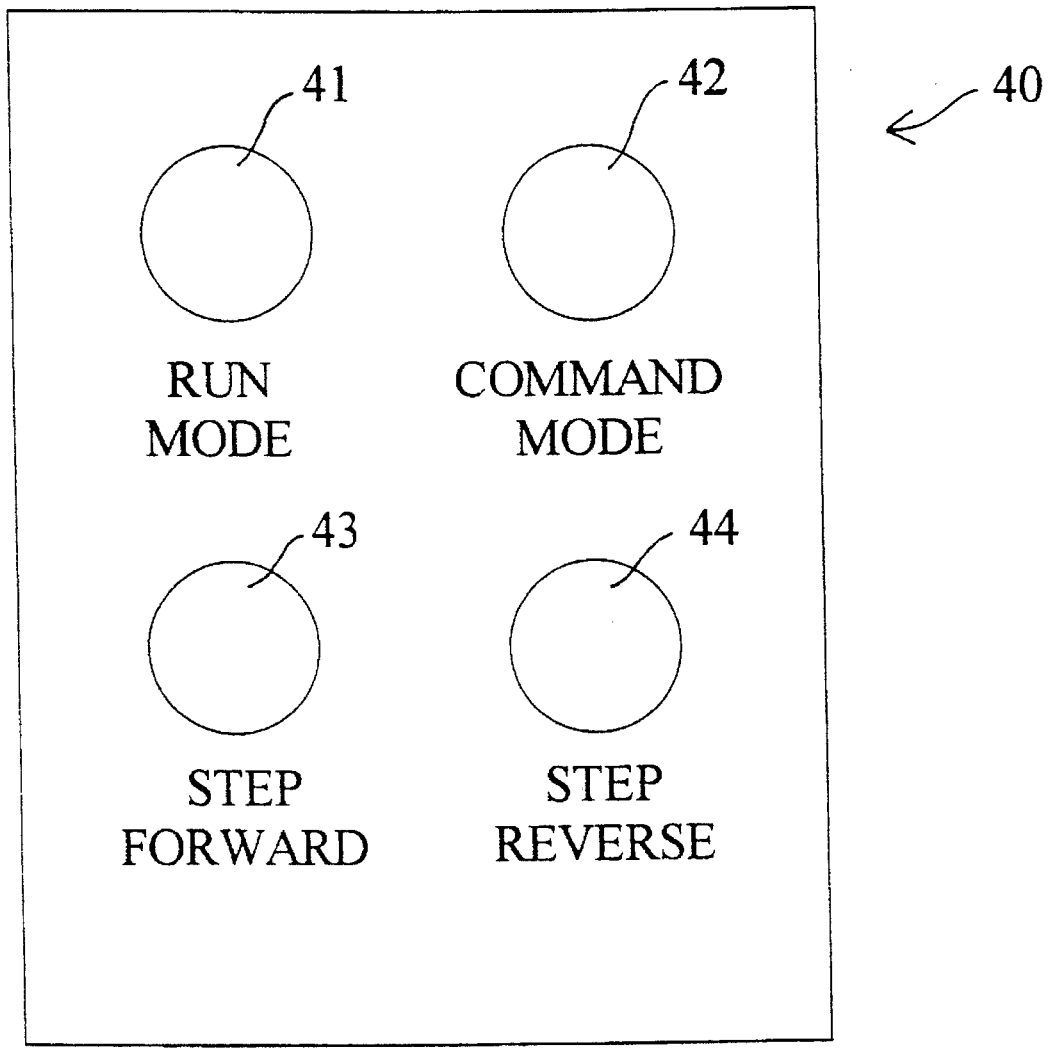
FIG. 4 is an elevational view of a hand held pendant adapted for use as the input device illustrated in FIG. 3.

As discussed above, an input mechanism 38 is connected to the controller 31. The input mechanism 38 may be embodied as any conventional means for permitting an operator to generate controls signals to the controller 31, such as a keyboard, a pendant, and the like. Referring now to FIG. 4, there is illustrated a hand held pendant, indicated generally at 40, which can be used to control the operation of the controller 31. As shown therein, the pendant 40 includes four buttons, namely, a run mode button 41, a command mode button 42, a step forward button 43, and a step reverse button 44. Additional buttons may be provided on the pendant 40, but these four buttons 41 through 44 are the only buttons necessary for set up and normal operation of the machine tool 10.

Each of the buttons 41 through 44 is adapted to generate an electrical signal to the controller 31 when depressed. The run button 41 is adapted to generate a signal instructing the controller 31 to begin normal operation of the machine tool 10. As will be explained below, the controller 31 automatically executes the above described machine cycles when placed in the operating mode. The command mode button 42 is adapted to generate a signal instructing the controller 31 to enter into an active, but non-operating mode. As will be explained below, the controller 31 can step one sequence at a time through each of the individual sequences in the machine cycle when placed in the command mode. This mode is useful during set up and trouble shooting situations. The step forward button 43 and the step reverse button 44 are adapted to generate signals instructing the controller 31 to move either one sequence forward or one sequence backward in the selected machine cycle when it is in the command mode.

8. Video Display

Referring now to FIG. 5, there is illustrated a sample screen 50 for the video display 39. As shown therein, the screen 50 is divided into an upper section and a lower section. The upper section displays information relating to the operation of the left drill assembly 13, while the lower section displays information relating to the operation of the right drill assembly 14. Inasmuch as the upper and lower sections of the screen are otherwise identical in operation, only the upper section relating to the operation of the left drill assembly 13 will be discussed. Furthermore, although the screen 50 is illustrated as displaying the two different machine cycles for the two different drill assemblies 13 and 14, it will be appreciated that the screen 50 may be arranged to display only one of such machine cycles if desired. Alternatively, the screen 50 may be arranged to display more than two different machine cycles if the controller 31 is used to control additional machine tools.

In the illustrated embodiment, the left side of the upper section of the screen 50 displays the legends of the first, second, and third sequences of the forward mode of the AUTO.SEQUENCE "LEFT.HEAD" machine cycle, discussed above. At the same time, the right side of the upper section of the screen 50 displays the legends of the first, second, and third sequences of the reverse mode of the AUTO.SEQUENCE "LEFT.HEAD" machine cycle, also discussed above. When the run button 41 of the pendant 40 is depressed, the controller 31 activates the machine tool 10 to begin operation. When this occurs, the controller 31 is programmed to highlight the legend of the sequence which is currently being performed. Thus, as shown in FIG. 5, the first sequence "Start Hydraulic Pump" is highlighted by the controller 31. None of the legends of the sequences of the reverse mode are highlighted during normal operation of the machine tool 10 to prevent confusion, as will become apparent below.

When the controller 31 has completed the "Start Hydraulic Pump" sequence in the machine cycle, it immediately enters into the next "Advance Left Head" sequence. When this occurs, the controller 31 highlights the associated legend, as shown in FIG. 6. Note that the same three sequences remain displayed on the upper section of the screen 50. The only change is that the highlighting has moved from the first legend (which is no longer being performed) to the second legend (which is currently being performed).

When the controller 31 has completed the "Advance Left Head" sequence in the machine cycle, it immediately enters into the next "Start Left Drill" sequence. When this occurs, the controller 31 highlights the associated legend, as shown in FIG. 7. However, note that the same three sequences do not remain displayed on the upper section of the screen 50. Rather, the controller 31 scrolls down the list of sequences to display the second, third, and fourth sequences in the machine cycle. The highlighting has moved from the second legend (which is no longer being performed) to the third legend (which is currently being performed). This allows the operator to clearly see on the video display 39 not only what sequence is currently being performed, but also what sequences immediately precede and follow the sequence currently being performed.

Thus, as shown in FIGS. 8 through 10, the controller 31 continues to scroll through the legends of the sequences until it reaches the end of the machine cycle. Throughout this entire process, the sequence which is currently being performed is always highlighted for the convenience of the operator. This information can be used by an operator of the machine tool 10 to easily monitor the operation thereof.

As discussed above, when the command mode button 42 of the pendant 40 is depressed, the controller 31 is placed in the command mode. In the command mode, the controller 31 can step one sequence at a time through each of the individual sequences in the machine cycle. Referring now to FIG. 11, the screen 50 is illustrated when the controller 31 is initially placed in the command mode. As shown therein, the controller 31 is programmed to highlight one legend on each of the forward sequences and the reverse sequences. The highlighted sequence represents the next sequence which will be performed by the controller 31 if one of the forward and reverse step buttons 43 and 44 is depressed. Accordingly, in FIG. 11, both the "Start Hydraulic Pump" sequence in the forward machine cycle and the "Stop Hydraulic Pump" sequence in the reverse machine cycle are highlighted.

Figure 12:
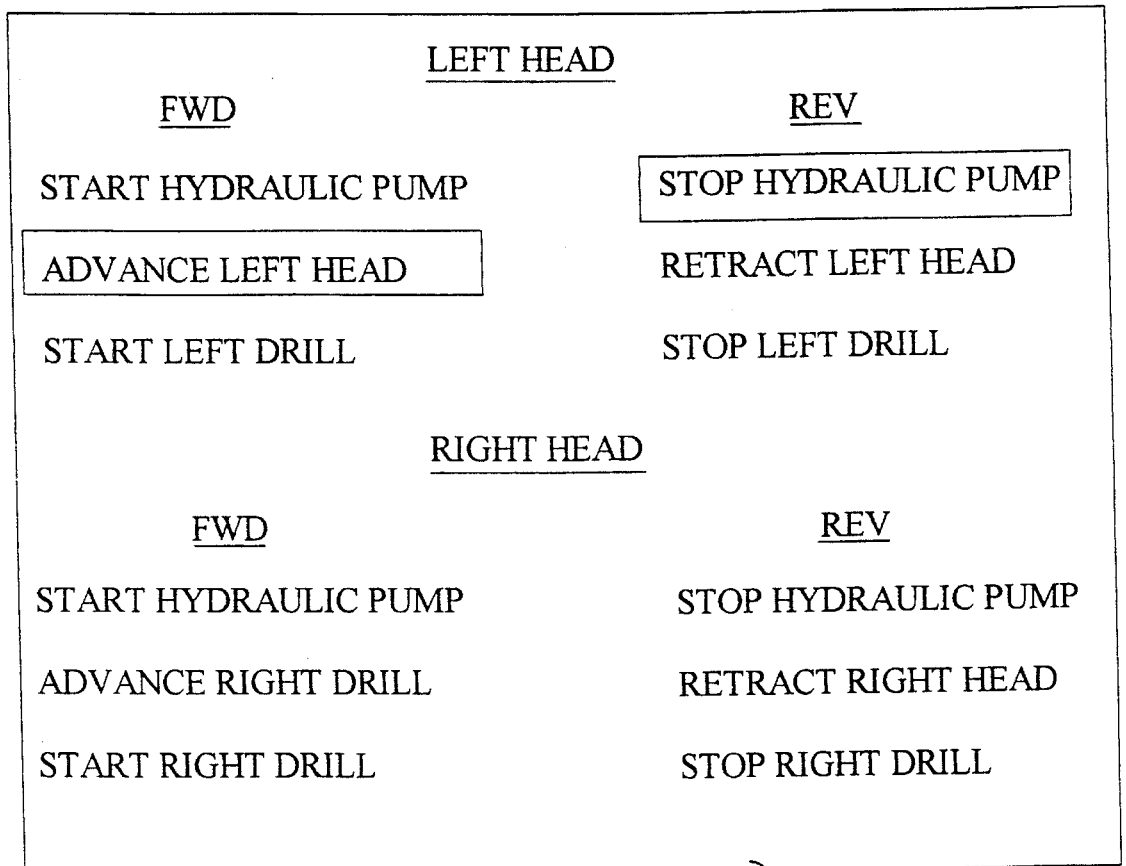

When the forward step button 43 is depressed, the controller 31 executes the highlighted sequence in the forward machine cycle, namely, "Start Hydraulic Pump". When that sequence was completed, the controller 31 would highlight the next step in the forward machine cycle, namely, "Advance Left Drill" as shown in FIG. 12 As also shown therein, the controller 31 continues to highlight the "Stop Pump" sequence in the reverse machine cycle. If the reverse step button 44 was depressed, the controller 31 would execute that sequence, and the screen 50 would return to the condition illustrated in FIG. 11.

Figure 13:
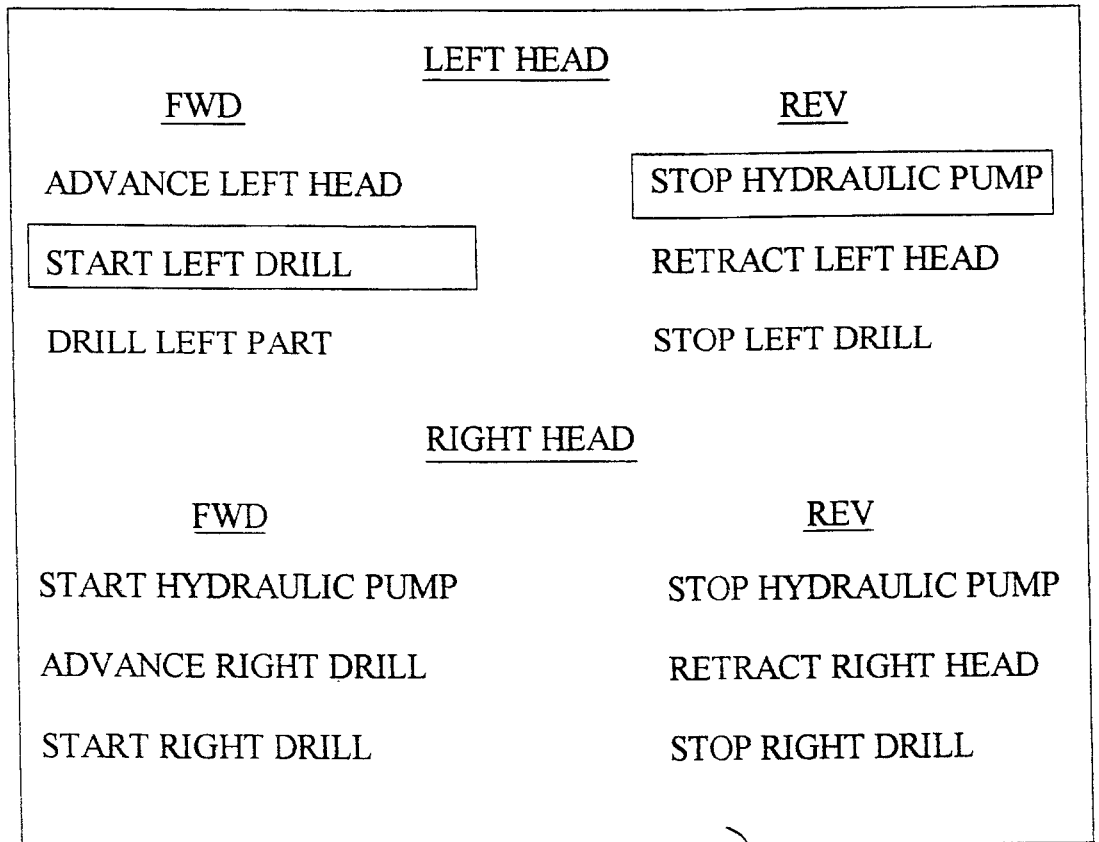

When the forward step button 43 is again depressed, the controller 31 executes the highlighted sequence in the forward machine cycle, namely, "Advance Left Head". When that sequence was completed, the controller 31 would highlight the next step in the forward machine cycle, namely, "Start Left Drill" as shown in FIG. 13. As also shown therein, the controller 31 would highlight the next sequence in the reverse machine cycle, namely, "Retract Left Head". If the reverse step button 44 was depressed, the controller 31 would execute that sequence, and the screen 50 would return to the condition illustrated in FIG. 12. The entire machine cycle can be stepped through one sequence at a time in this manner.

Thus, it can be seen that the screen 50 highlights two of the sequences (one in the forward mode and one in the reverse mode) when it is in the command mode of operation. This dual highlighting serves two purposes. First, it clearly distinguishes between when the controller 31 is operating in the run mode (because only one sequence in the forward mode is highlighted) and in the command mode (because two sequences are highlighted). Second, it clearly displays to the operator which sequence will be performed, whether the step forward button 43 or the step reverse button 44 is depressed. This greatly facilitates the use of the controller 31 and the machine tool 10 by the operator.

As discussed above, when the controller 31 operates the machine tool 10 in either the run mode or the command mode, errors in the operation thereof may be detected. These errors may occur as a result of the failure of the machine tool 10 to complete a sequence in the time period allotted by the WATCHDOG command instruction. For example, in the ADVANCE.LEFT.HEAD sequence, the WATCHDOG command instruction allotted a total of ten seconds for completion. Assuming, for example, that the left drill assembly 13 was jammed and was unable to move, the ten second period would expire while the controller was at the INPUT command instruction waiting for a signal from the left intermediate switch 18L. When this occurs, the controller 31 would shut down the machine tool 10 and display the screen shown in FIG. 14.

Figure 14:
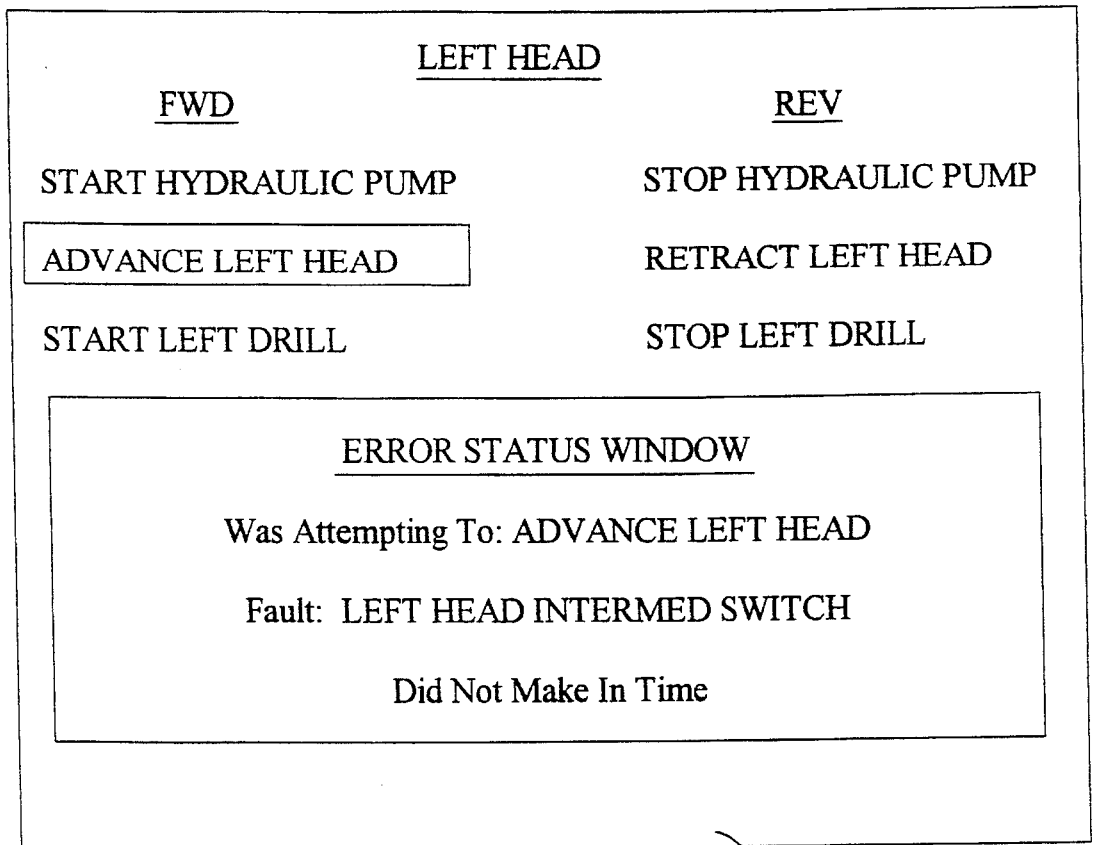
FIG. 14 is a graphic representations of a screen displayed on the video terminal shown in FIG. 3 when an error has been detected.

As shown therein, the upper portion of the screen 50 in FIG. 14 continues to display the forward and reverse sequences of the left drill and continues to highlight the "ADVANCE LEFT DRILL" legend. However, the lower portion of the screen 50 display an error message. The error message displays two important pieces of information. First, the error message displays the legend of the sequence which the controller 31 was attempting to execute when the error occurred. Second, the error message displays the legend of the particular command instruction within the sequence which the controller 31 was attempting to perform when the error occurred.

In this instance, the "ADVANCE LEFT HEAD" sequence was being performed by the controller 31 when the error occurred. At that time, the controller 31 was waiting to receive the input signal from the left intermediate switch 18L when the time period set by the WATCHDOG command instruction expired. Thus, the legend "LEFT HEAD INTERMED SWITCH" is followed by a standard comment "Did Not Make In Time" for the WATCHDOG timer. Thus, the operator of the machine tool 10 is clearly informed as to the nature of the error. Using this information, the operator may quickly and easily diagnose the problem which caused the error (perhaps by placing the controller 31 in the command mode and stepping forward and rearward through the sequences) to correct it. In instances other than when the WATCHDOG timer expires, the ERROR command instruction displays a text message related to the nature of the command instruction which was attempted to be performed on the video display.

9. Hardware And Software Implementation

The nature and operation of the control system 30 has been described in detail above. As previously discussed, the controller 31 itself may be embodied as any conventional microprocessor, computer, or other similar electronic computing apparatus. Additionally, any desired software or computing language may be used to implement the functions described above. A person having ordinary skill in the art of computer programming would be able to construct an operating program which would be capable of functioning as described above. Thus, it is contemplated that this invention may be practiced on any computing apparatus by means of any operating software.

10. Conclusion

This invention relates to an improved control system for controlling multiple operations of a machine tool. The control system includes an electronic controller having a plurality of outputs which provide signals to the various individual tools of the machine tool to control the operating conditions thereof. The controller further has a plurality of inputs providing it with signals which are representative of the operating conditions of the various individual tools of the machine tool. The controller is responsive to an operating program and to the various inputs thereto for generating signals to the various outputs thereof so as to control the operation of the machine tool.

The operating program of the controller is designed for simplicity and ease of use. A plurality of standard command instructions are provided for accomplishing this. A group of command instructions are selected and sequentially arranged to cause the controller to perform a single operation or unit of work for the machine tool. This group of command instructions is referred to as a sequence. A plurality of sequences are selected and sequentially arranged to cause the controller to perform a complete operation for the machine tool. This group of sequences is referred to as a machine cycle.

To facilitate the operation of the controller and the machine tool by an operator, an input mechanism and a video display are provided with the controller. The input mechanism can include various buttons for generating control signals to the controller to regulate the operation thereof. The video display displays a plurality of the sequences in the machine cycle for performing certain functions when operated in the forward mode, as well as the corresponding sequences in the machine cycle for performing the opposite functions when operated in the reverse mode. When the controller is operated in the run mode, the video display highlights only the current sequence being performed in the forward mode. When the controller is operated in the command mode, the video display highlights the next sequence to be performed if the step forward button is depressed and next sequence to be performed if the step reverse button is depressed. The video display displays error messages in easy to understand text language for the operator. The error texts identify both the sequence and the particular command instruction therein being performed when the error occurred for the convenience of the operator.

An important aspect of this invention relates to the error messages and how they are displayed. In the past, known controllers had to be programmed with a large number of error messages in anticipation of every possible error which could occur. This required a substantial amount of time by the programmer and occupied a substantial amount of memory space within the controller. In this invention, however, very little time or space is required to create and store error messages. This is because the command instructions and sequences of this invention are clearly defined in functional terms directed toward the ultimate function or end result of the operation being performed. By displaying the terms of these command instructions and sequences as error messages, it is easy to diagnose problems which are encountered during the operation of the machine tool. Furthermore, the controller may be embodied as a relatively small computing apparatus, such as a microprocessor, as opposed to a larger and more expensive device.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A controller for controlling a machine tool comprising:

means for executing a programmed machine cycle for generating output signals to control the machine tool to perform a plurality of operations, said programmed machine cycle comprising a plurality of sequences wherein each of said sequences defines an individual operation to be performed by the machine tool each of said sequences also being associated with a legend which describes said individual operation of said machine tool defined thereby;

an input mechanism for selectively controlling the operation of said executing means between a run mode and a command mode, said run mode for automatically operating the machine tool through a complete programmed machine cycle and said command mode for manually stepping one sequence at a time through each of said sequences comprising a programmed machine cycle;

a visual display operatively connected to said executing means for displaying a plurality of said legends; and means for highlighting at least one particular one of said plurality of legends displayed on said visual display wherein, when said run mode is selected, said particular highlighted legend is said legend associated with said sequence currently being performed and, when said command mode is selected, said particular highlighted legend is said legend associated with said next sequence to be performed.

2. The controller defined in claim 1 wherein each of said sequences is comprised of a plurality of command instructions, each of said command instructions defining an individual step of said sequence and each of said command instructions also being associated with a legend which describes said individual step of said sequence.

3. The controller defined in claim 2 wherein said visual display displays a message associated with an error, said error message including said legend of said sequence and said legend of said command instruction said executing means was attempting to execute when said error occurred.

4. The controller defined in claim 1 wherein said programmed machine cycle includes a forward mode and a reverse mode, said forward mode comprising a plurality of sequences for performing a certain operation of the machine tool and said reverse mode comprising a plurality of sequences for performing the opposite reverse operation of the machine tool.

5. The controller defined in claim 4 wherein said visual display displays a first set of legends comprised of three legends associated with three sequential sequences comprising said forward mode of said programmed machine cycle and said visual display displays a second set of legends comprised of three legends associated with three sequential sequences comprising said reverse mode of said programmed machine cycle.

6. The controller defined in claim 5 wherein, when said run mode is selected, said highlighted legend appears in either said first set of legends or said second set of legends, said highlighted legend being said legend associated with said sequence currently being performed, and said remaining two legends being associated with sequences immediately preceding and immediately following said sequence currently being executed.

7. The controller defined in claim 4 wherein said input mechanism further includes means for selecting a forward step and means for selecting a reverse step, said forward step means and said reverse step means for manually stepping one sequence at a time through each of said sequences comprising a programmed machine cycle.

8. The controller defined in claim 7 wherein, when said command mode is selected, said highlighting means highlights a legend from said first set of legends in said forward mode and a legend from said second set of legends in said reverse mode.

9. The controller defined in claim 8 wherein said forward step means is used for selecting said highlighted legend in said first set of legends associated with three sequential sequences comprising said forward mode of said programmed machine cycle and said reverse step means is used for selecting said highlighted legend in said second set of legends associated with three sequential sequences comprising said reverse mode of said programmed machine cycle.

10. The controller defined in claim 1 wherein said visual display displays a message associated with an error.

11. An automated machine tool comprising:
   a machine tool capable of performing a plurality of operations; and
   a controller for controlling said machine tool, said controller including:
   a) means for executing a programmed machine cycle for generating output signals to control said machine tool to perform a plurality of operations, said programmed machine cycle comprising a plurality of sequences wherein each of said sequences defines an individual operation to be performed by said machine tool, each of said sequences also being associated with a legend which describes said individual operation of said machine tool defined thereby;
   b) an input mechanism for selectively controlling the operation of said executing means between a run mode and a command mode, said run mode for automatically operating said machine tool through a complete programmed machine cycle and said command mode for manually stepping one sequence at a time through each of said sequences comprising a programmed machine cycle;
   c) a visual display operatively connected to said executing means for displaying a plurality of said legends; and
   d) means for highlighting at least one particular one of said plurality of legends displayed on said visual display wherein, when said run mode is selected, said particular highlighted legend is said legend associated with said sequence currently being performed and, when said command mode is selected, said particular highlighted legend is said legend associated with said next sequence to be performed.

12. The automated machine tool defined in claim 11 wherein said machine tool is a double ended drilling apparatus including a clamping mechanism for securing a workpiece, a right drill assembly, a left drill assembly, and a hydraulic system for selectively sliding said right drill assembly and said left drill assembly toward and away from the workpiece.

13. The automated machine tool defined in claim 12 wherein said programmed machine cycle includes a forward mode and a reverse mode, said forward mode comprising a plurality of sequences for performing a certain operation of said machine tool and said reverse mode comprising a plurality of sequences for performing the opposite reverse operation of said machine tool.

14. The automated machine tool defined in claim 13 wherein said certain operation includes advancing said right or left drill assembly and starting said hydraulic system while said opposite reverse operation includes retracting said right or left drill assembly and stopping said hydraulic system, respectively.

15. The automated machine tool defined in claim 11 wherein each of said sequences is comprised of a plurality of command instructions, each of said command instructions defining an individual step of said sequence and each of said command instructions also being associated with a legend which describes said individual step of said sequence.

16. The automated machine tool defined in claim 11 wherein said programmed machine cycle includes a forward mode and a reverse mode, said forward mode comprising a plurality of sequences for performing a certain operation of said machine tool and said reverse mode comprising a plurality of sequences for performing the opposite reverse operation of said machine tool.

17. The controller defined in claim 16 wherein said visual display displays a first set of legends comprised of three legends associated with three sequential sequences comprising said forward mode of said programmed machine cycle and said visual display displays a second set of legends comprised of three legends associated with three sequential sequences comprising said reverse mode of said programmed machine cycle.

18. The controller defined in claim 17 wherein, when said command mode is selected, said highlighting means highlights a legend from said first set of legends in said forward mode and a legend from said second set of legends in said reverse mode.

19. The controller defined in claim 18 wherein said input mechanism further includes means for selecting a forward step and means for selecting a reverse step, said forward step means being used for selecting said highlighted legend in said first set of legends associated with three sequential sequences comprising said forward mode of said programmed machine cycle and said reverse step means being used for selecting said highlighted legend in said second set of legends associated with three sequential sequences comprising said reverse mode of said programmed machine cycle.

20. The controller defined in claim 11 wherein said visual display displays a message associated with an error.

* * * * *